April 19, 1960     H. P. LUDWIG ET AL     2,932,874
APPARATUS FOR MANUFACTURING CONCRETE PIPE
Filed Nov. 24, 1954     9 Sheets-Sheet 1

INVENTOR.
HERBERT P. LUDWIG
ELMER L. JOHNSON
BY
Lyon & Lyon
ATTORNEYS

April 19, 1960 H. P. LUDWIG ET AL 2,932,874
APPARATUS FOR MANUFACTURING CONCRETE PIPE
Filed Nov. 24, 1954 9 Sheets-Sheet 2

INVENTOR.
HERBERT P. LUDWIG
ELMER L. JOHNSON
BY
Lyon & Lyon
ATTORNEYS

April 19, 1960 H. P. LUDWIG ET AL 2,932,874
APPARATUS FOR MANUFACTURING CONCRETE PIPE
Filed Nov. 24, 1954 9 Sheets-Sheet 3

INVENTOR.
HERBERT P. LUDWIG
ELMER L. JOHNSON
BY Lyon & Lyon
ATTORNEYS

April 19, 1960 H. P. LUDWIG ET AL 2,932,874
APPARATUS FOR MANUFACTURING CONCRETE PIPE
Filed Nov. 24, 1954 9 Sheets-Sheet 7

INVENTOR.
HERBERT P. LUDWIG
ELMER L. JOHNSON
BY
*Lyon & Lyon*
ATTORNEYS

April 19, 1960  H. P. LUDWIG ET AL  2,932,874
APPARATUS FOR MANUFACTURING CONCRETE PIPE
Filed Nov. 24, 1954  9 Sheets-Sheet 9

INVENTOR.
HERBERT P. LUDWIG
ELMER L. JOHNSON
BY
Lyon & Lyon
ATTORNEYS

United States Patent Office 2,932,874
Patented Apr. 19, 1960

2,932,874

APPARATUS FOR MANUFACTURING CONCRETE PIPE

Herbert P. Ludwig, Colton, and Elmer L. Johnson, San Bernardino, Calif., assignors to Concrete Conduit Company, Colton, Calif., a corporation of California Application November 24, 1954, Serial No. 471,074

8 Claims. (Cl. 25—30)

Our invention relates to apparatus for manufacturing concrete pipe, and included in the objects of our invention are:

First, to provide an apparatus for manufacturing concrete pipe.

Second, to provide an apparatus for manufacturing concrete pipe which involves a particularly expeditious means and methods of handling the molds and centrifugally casting the concrete pipe sections therein.

Third, to provide an apparatus for manufacturing concrete pipe wherein, with little interruption in operation, the diameter of pipe manufactured may be changed, or the end construction of the pipe sections changed, so that different sizes and styles of pipe may be manufactured.

Fourth, to provide an apparatus for manufacturing concrete pipe which incorporates a novel centrifugally casting drum and mold adapted to be inserted in one end of the drum and removed from the other, and wherein a concrete mixing and delivery machine is employed to thrust one mold into the casting drum and cause the preceding mold to be ejected.

Fifth, to provide an apparatus for manufacturing concrete pipe which reduces to a minimum manual handling of the molds and lends itself to control from a single station so that the complete manufacturing operation may be conducted by a minimum personnel.

Sixth, to provide an apparatus of this class wherein the concrete pipe is ready for delivery in as little as 48 hours after being centrifugally cast.

Seventh, to provide in an apparatus of this class a novelly arranged vibrator means which acts against one or both ends of the mold to effect a rapid leveling of the concrete and produce a particularly dense, smooth surfaced concrete at the axial extremities of the pipe in complete conformity with the end casting rings.

With the above and other objects in view, as may appear hereinafter, reference is directed to the accompanying drawings in which.

Our apparatus for manufacturing concrete pipe comprises essentially a pair of centrifugal casting machines A from which the completed pipe P in its mold M is delivered by a crane and hoist unit B to a loading area of a turntable structure C. A second crane and hoist unit D traverses the turntable for the purpose of stripping and removing the molds M from partially cured concrete pipe P. The molds M are returned to the casting machines A by means of a mold return conveyor unit E.

Behind the centrifugal casting machines A is a combined concrete charger and mold delivery unit F which picks up the molds M from the return conveyor unit E and delivers them to the centrifugal casting machines. After positioning the molds M the concrete charger delivers concrete to the interior of the molds.

Reference is first directed to Figs. 1 to 7, inclusive, which show particularly the turntable structure C. The turntable structure includes a circular track having ties 1 and circular fixed rails 2 which support a circular carriage frame 3 having rollers 4.

Mounted on the rollers 4 are circular rotating rails 5 which are joined and covered by a circular platform 6. A drive cable 7 is wrapped about the radially outer of the rotating rails 5 and is driven by a motor 8.

Figure 1:
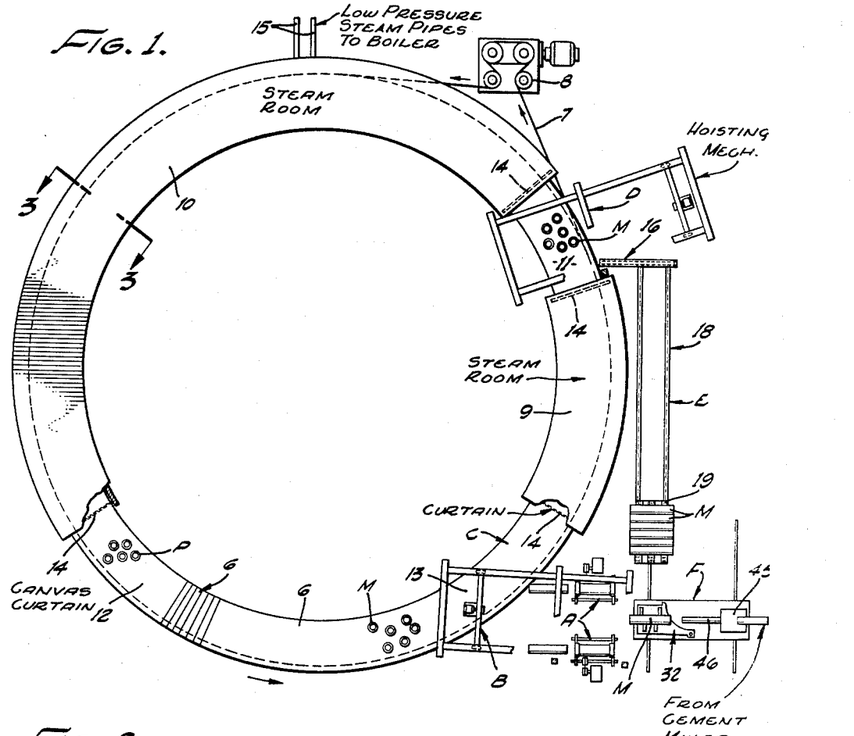
Figure 1 is a diagrammatical plan view of our apparatus for manufacturing concrete pipe.
Figure 2:
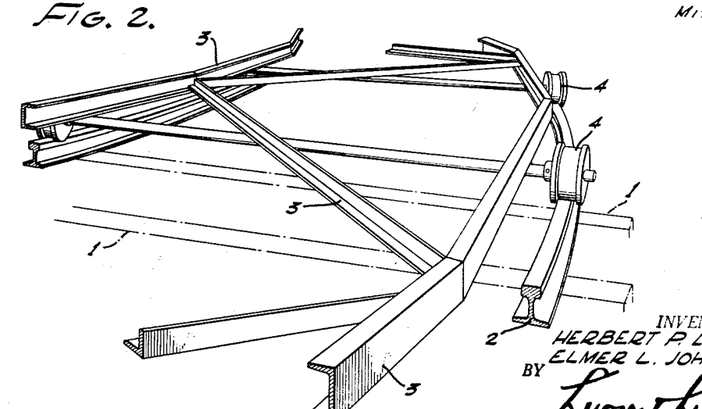
Fig. 2 is a fragmentary perspective view, showing the under carriage of the turntable structure.
Figure 3:
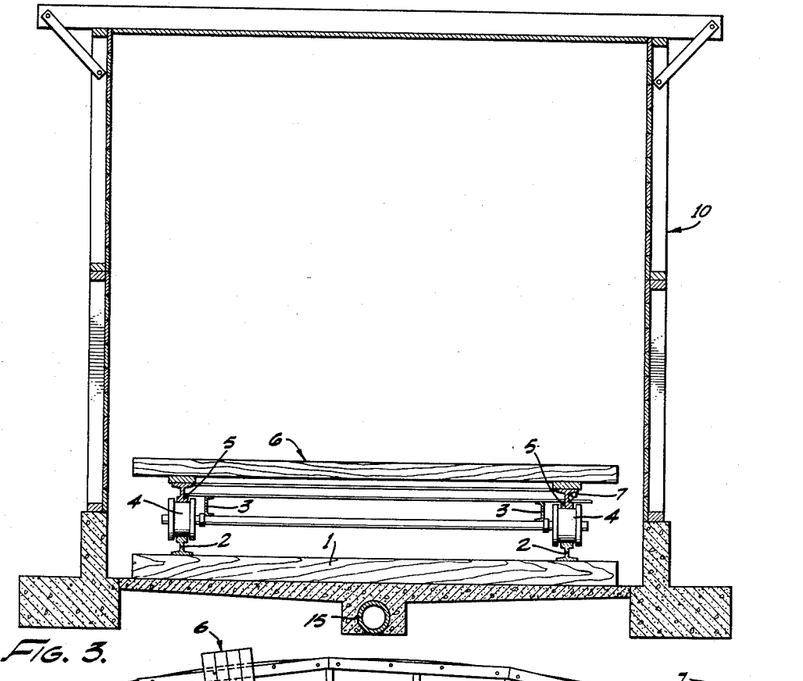
Fig. 3 is a transverse sectional view through 3—3 of Fig. 1, taken through one of the steam rooms through which the turntable structure passes.
Figures 4, 5, 6, 7:
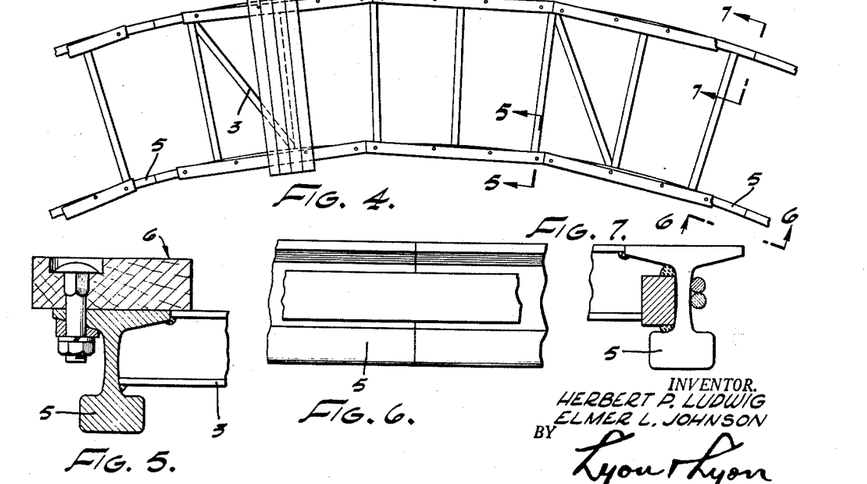
Fig. 4 is a fragmentary plan view of the under carriage for the turntable structure.
Fig. 5 is a fragmentary sectional view through 5—5 of Fig. 4.
Fig. 6 is a fragmentary elevational view from the line 6—6 of Fig. 4.
Fig. 7 is a fragmentary sectional view through 7—7 of Fig. 4.

The platform 6 is adapted to rotate through a partial curing shed or steam room 9, and then through a final curing shed or steam room 10. A mold stripping area 11 is provided between the discharge end of the steam room 9 and the intake end of the steam room 10. A pipe delivery area 12 is provided in the region adjacent the discharge end of the steam room 10, whereas beyond the discharge area 12 there is provided a loading area 13. The loading area is served by the crane and hoist unit B, whereas the mold stripping area 11 is served by the crane and hoist unit D. The ends of the steam rooms are provided with curtains 14 and the circular turntable structure C is equipped with steam supply pipes 15 set under the platform 6 within the steam rooms 9 and 10.

Reference is now directed principally to Figs. 8 to 11, 14 and 15. As will be described in more detail hereinafter, the molds M are in the form of longitudinally split cylinders capable of being removed from the partially cured concrete pipe P. On being stripped from the pipe, the crane and hoist unit D is employed to place the molds on a mold carrier or table 16, extending laterally from the turntable structure C.

The mold carrier or table 16 comprises a pair of tracks formed by a series of rollers and supported by adjustable standards 17. While on or prior to being placed upon the mold table or carrier the molds are closed and cleaned, and in some instances a reinforcing cage is inserted to be later cast in the concrete pipe P. The cylindrical molds are moved from the tables 16 on to a return conveyor 18 comprising a plurality of chains, so that the molds M may be stacked in parallelism and moved transversely to their longitudinal axis by the return conveyor 18. The molds are discharged from the return conveyor 18 to a temporary storage table 19 having a plurality of rollers and disposed on an incline, the angle of which may be adjusted by a height adjustment jack 20.

Near the discharge end of the temporary storage table 19, at either side, is a pair of arcuately pivotal latch plates 21 having dogs 22 normally directed upward to be engaged by a mold M. The latch plates are provided with retainer quadrants 23, and when the latch plates are pivoted from the position shown in Fig. 14 to the position shown in Fig. 15 the extreme mold M may be discharged from the table, but the remaining molds are restrained by the quadrants 23. The latch plates 21 are provided with trip arms 24 which are engaged by means which will be described hereinafter.

Extending at ground level from the discharge end of the temporary storage table 19 is a track 25 comprising a pair of widely spaced rails, one extending under the temporary storage table and the other laterally or rearwardly therefrom. The track 25 passes rearwardly of the pair of centrifugal casting machines A. The track supports the concrete charger and mold delivery unit F, shown best in Figs. 12, 13, 16, 17, 18, and 19.

Figure 16:
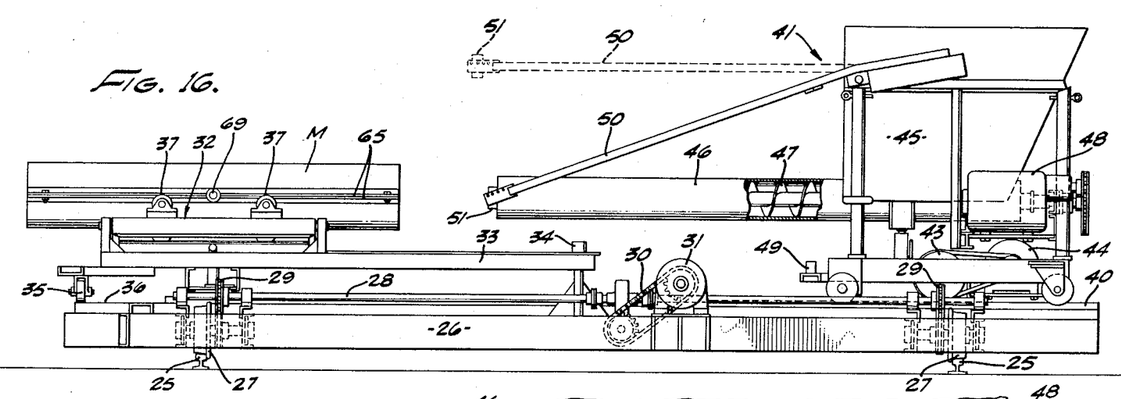
Fig. 16 is a side view of the concrete charger and mold delivery unit.
Figure 17:
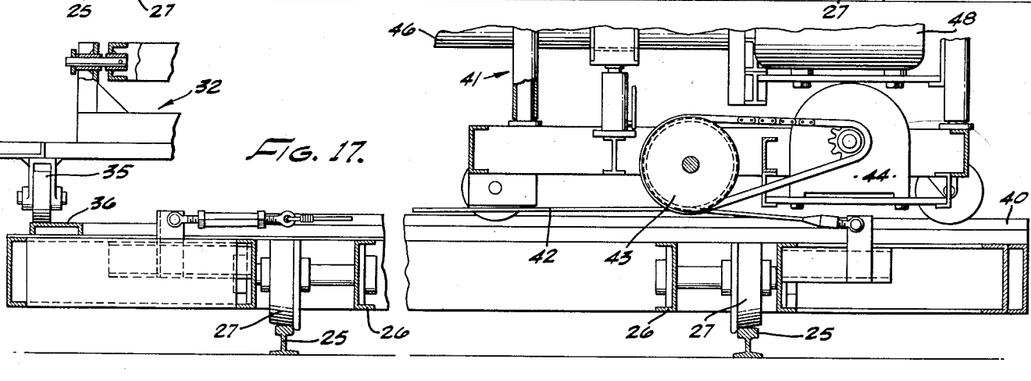
Fig. 17 is an enlarged fragmentary side view thereof.
Figures 18, 19, 20:
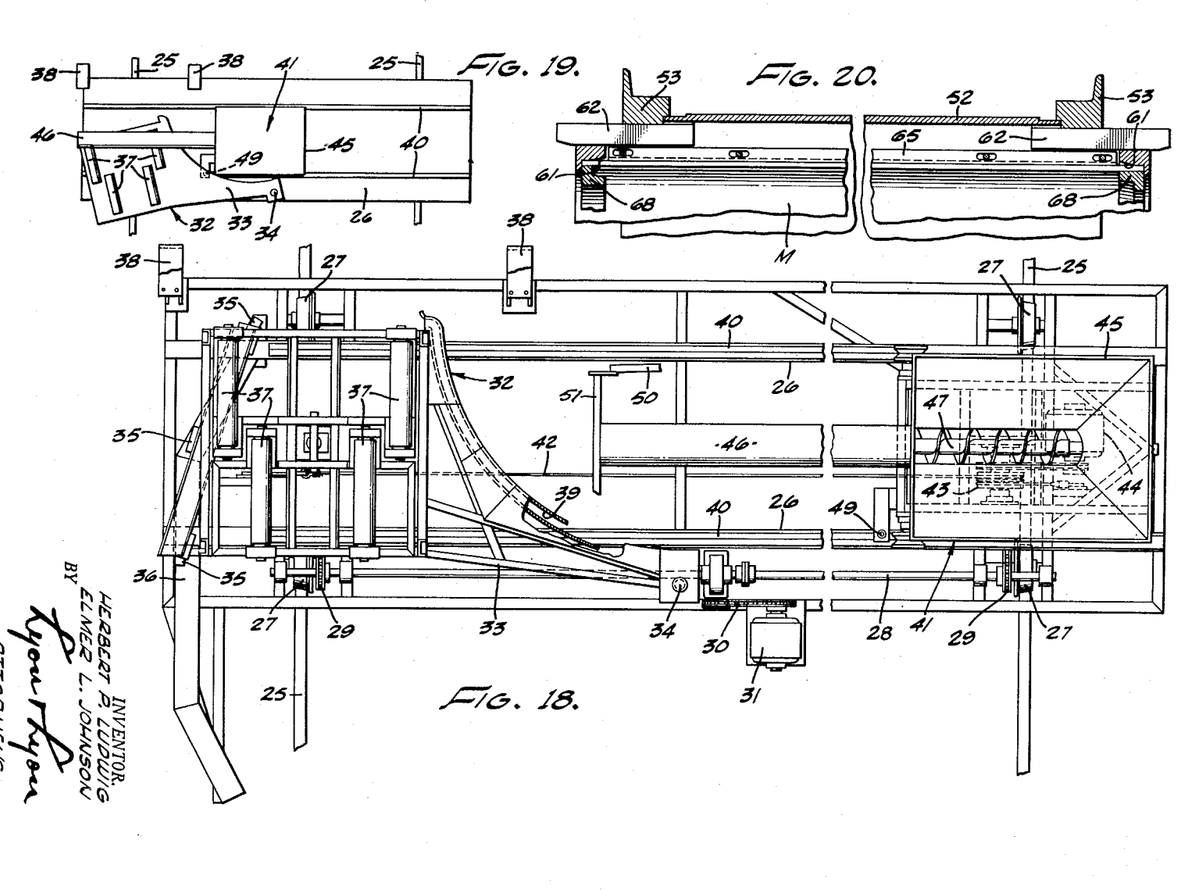
Fig. 18 is a plan view of the concrete charger and mold delivery unit.
Fig. 19 is a diagrammatical plan view of the concrete charger and mold delivery unit, illustrating the manner in which the mold carriage is deflected upon introduction of the concrete discharge pipe into the pipe casting machine.
Fig. 20 is a fragmentary, longitudinal sectional view of a mold unit and adjacent portions of the centrifugal casting machine taken along the line 20—20 of Fig. 21.
Figure 21:
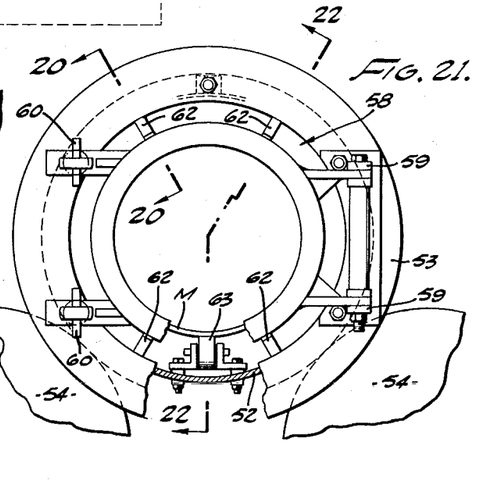
Fig. 21 is a fragmentary end view of the centrifugal casting machine.
Figure 22:
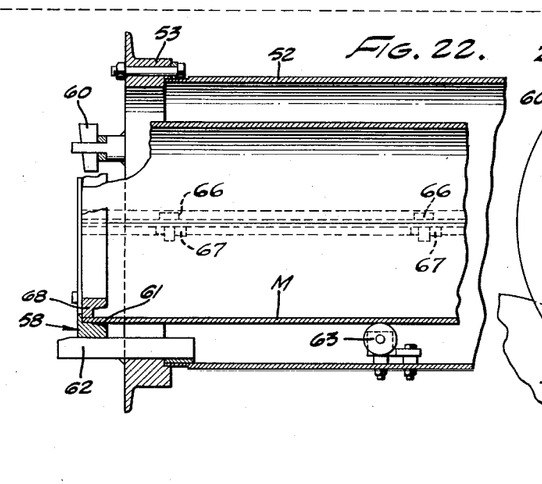
Fig. 22 is a fragmentary sectional view thereof taken through 22—22 of Fig. 21.

The concrete charger and mold delivery unit F includes a carriage 26 supported on wheels 27 which ride on the track 25. A pair of the wheels 27 are connected to a drive shaft 28 through chains 29. The drive shaft is connected through a gear reduction unit and chain drive 30 to a motor 31 mounted on the carriage. Thus the carriage may be propelled on the track 25 to and from the temporary storage table 19.

Mounted on the forward portion of the carriage 26 is a mold-receiving table 32. The table is provided with a rearwardly directed offset arm 33 terminating in a vertical pivot 34. The forward portion of the table is supported on rollers 35 which roll on an arcuate track 36. Supported on the mold-receiving table 32 are sets of inclined rollers 37 which define an obtuse V-channel into which the molds M pass when discharged from the temporary storage table 19. The inclined rollers 37 are arranged so that the mold M may be moved forwardly from the receiving table 32.

Figure 15:
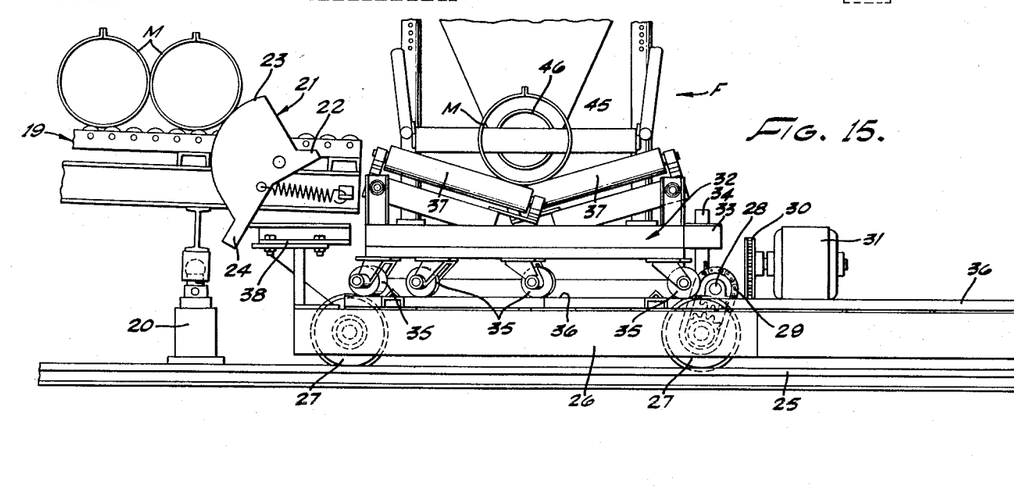
Fig. 15 is a similar view of the extremity thereof, showing the mold delivery unit in proximity thereto to receive a mold from the return conveyor unit.

Supported on the carriage 26 at its side adjacent the temporary storage table 19 is a pair of trip posts 38 adapted to engage the trip arms 24 of the latch plates 21 when the carriage and mold-receiving table 32 are moved adjacent the temporary storage table 19, as shown best in Fig. 15.

The rearwardly directed arm 33 of the mold-receiving table 32 is provided with an arcuate rearward margin which defines an inverted channel-shaped cam track 39 adapted to be engaged by a cam roller assembly, brought out hereinafter.

The carriage 26 is provided with a track 40 extending longitudinally thereof, that is, at right angles to the track 25. Mounted on the track 40 is a concrete charger carriage 41. The concrete charger carriage is adapted to be moved forwardly and rearwardly longitudinally of the carriage 26 by means of a cable 42 attached at its extremities, near the extremities of the carriage 26. The cable 42 is wrapped about a drum 43 mounted on the charger carriage 41 and driven by a motor 44.

Mounted on the charger carriage 41 is a concrete hopper to receive premixed concrete, designated 45. In either case the hopper 45 is provided with a horizontal forwardly directed delivery tube 46 having a screw conveyor 47 therein. The screw conveyor is driven by a motor 48 carried on the charger carriage 41. Projecting forwardly of the charger carriage 41 is an arm which supports a cam roller 49 positioned so as to enter the cam track 39 as the hopper 45 is moved forwardly, and causing the mold-receiving table 32 to turn about the pivot 34 so that the mold-receiving table 32 may be swung out of the way of the concrete charger carriage.

Pivotally supported on the hopper 45 is a pair of counterbalanced arms 50 which are joined at their extremities by a cross bar or pusher bar 51. The pusher bar is adapted to be moved downwardly to a position immediately in front of the delivery tube 46, as shown by solid lines in Fig. 16, or may be elevated to the dotted line position shown therein.

The pusher bar 51 is employed, as will be brought out more specifically hereinafter, to push a mold M into either one of the centrifugal casting machines A. The delivery tube 46 is arranged, when the pusher bar 51 is elevated clear of its end, to enter either centrifugal casting machine to distribute concrete within the mold.

The centrifugal casting machines are shown best in Figs. 19 to 25. Each machine includes a tubular open-ended centrifugal casting drum 52 having end flanges 53, each of which rests between pairs of drive wheels 54 forming a drive cradle. Coaxial pairs of drive wheels 54 are connected by shafts 55 which are suitably supported in a frame structure 56. One of the shafts is connected to a motor drive 57.

Mounted at each end of the centrifugal casting drum 52 is an annular end gate 58. The gates are supported by hinges 59 and are adapted to be secured in position over the ends of the centrifugal casting drum by pin and wedge means 60, or other suitable securing means. The axial ends of the gates facing into the casting drum are provided with tapered mold-receiving recesses 61 adapted to receive the cylindrical ends of a mold M and centered relative to the casting drum. To aid in inserting the molds M, which are, of course, smaller in diameter than the casting drum 52, there is provided suitable longitudinally extending guides 62 within the drum, and in addition rollers 63 may be provided, the rollers being located at the low side of the drum when the drum is stopped for the purpose of inserting or removing a mold.

The molds M are made in various sizes for casting pipe of different diameter. The molds of larger diameter comprise a pair of complementary semicylindrical sections 64 having longitudinal flanges 65 along their confronting edges. One pair of such flanges is permanently joined by bolts and nuts, the other flanges are temporarily joined by special pins 66 having slots into which are driven wedges 67. The molds of smaller diameter are preferably formed from a single cylinder split lengthwise. Flanges 65 border the confronting ends of the split cylinder. Similar flanges are provided diametrically opposite merely to balance the mold.

Removably fitted into the ends of the mold M are end casting rings 68. The end casting rings are shaped to provide any desired end finish to the pipe P, such as the tongue and groove shown in Fig. 20, or any other configuration.

Figure 23:
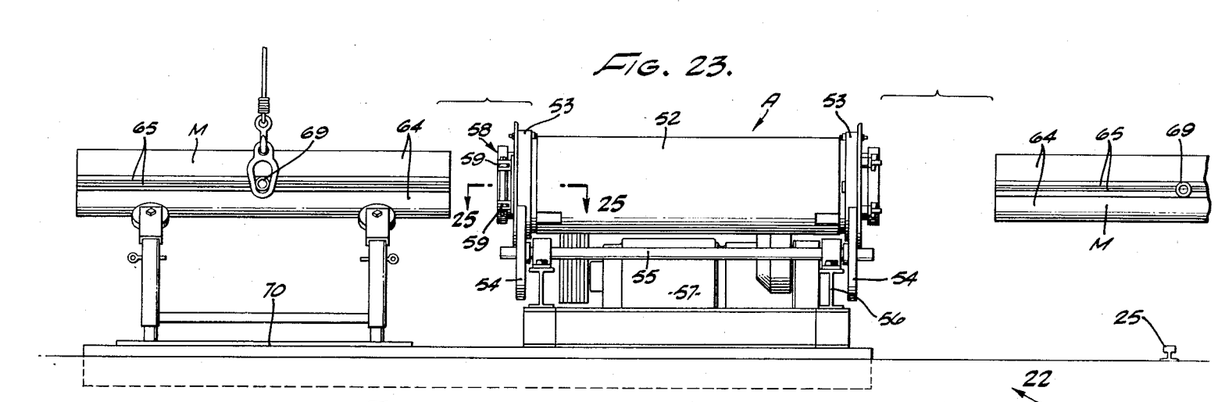
Fig. 23 is a side view of the centrifugal casting machine, showing a mold being supplied thereto and another mold as being delivered therefrom.

Approximately midway between the ends of the complementary sections 64 there is provided a pair of laterally directed hoisting lugs 69, so that the molds M may be picked up by the crane and hoist units D at approximately their centers of gravity, as indicated in Fig. 23.

The molds M are ejected from the centrifugal casting drums 52 by the entrance of a succeeding mold. The molds on leaving the centrifugal casting drums are received by a table 70 having suitable rollers.

Figure 12:
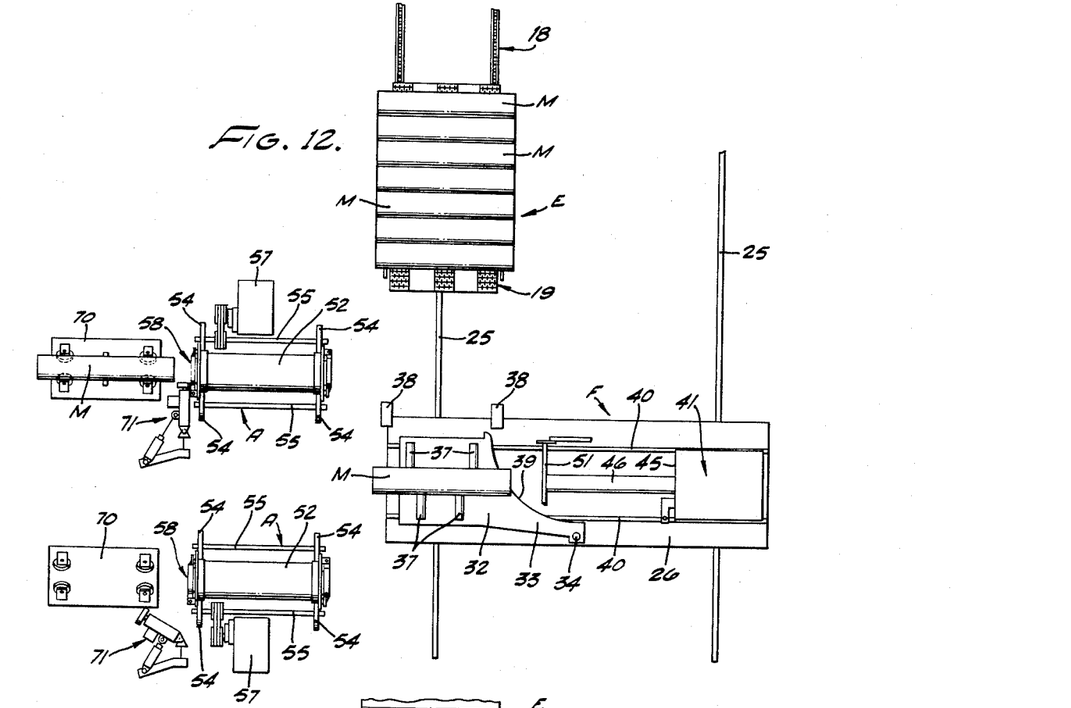
Fig. 12 is a substantially diagrammatical plan view, showing the discharge end of the mold return conveyor, a pair of centrifugal casting machines, and the concrete charger and mold delivery unit with a mold in position on the mold delivery unit.
Figure 13:
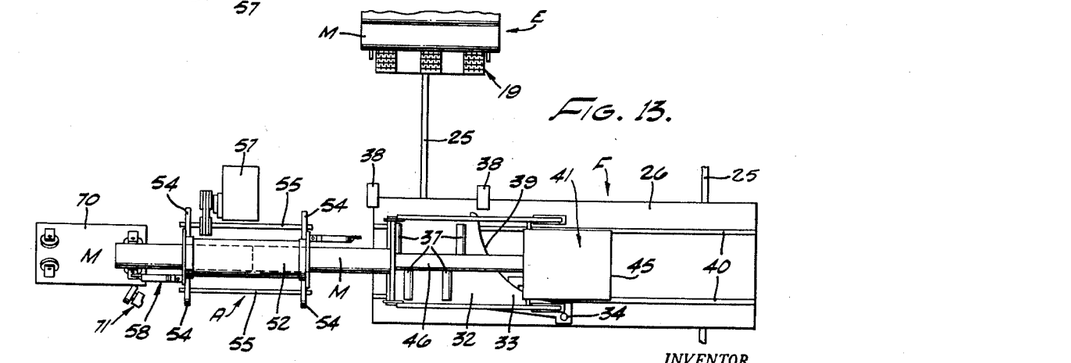
Fig. 13 is a similar diagrammatical view, showing a mold being thrust by the mold delivery unit into the centrifugal casting machine and effecting ejection of the preceding mold.
Figure 14:
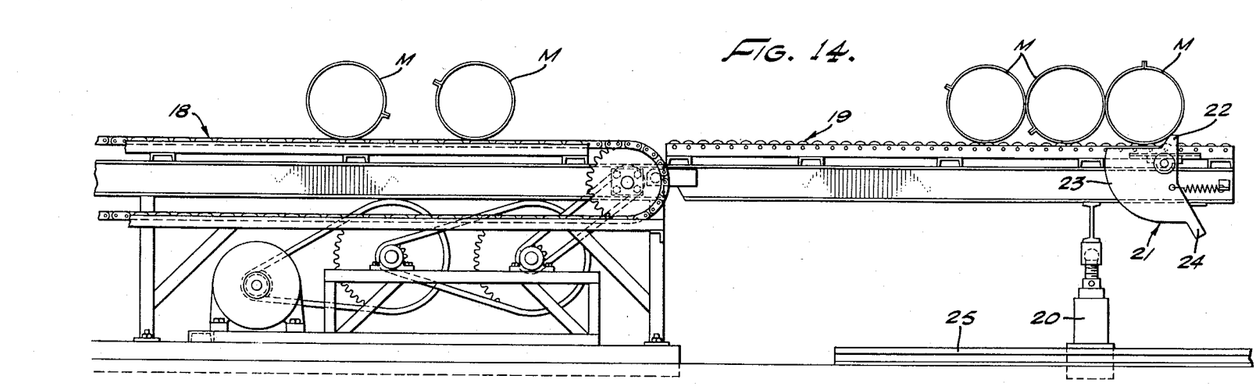
Fig. 14 is a side view of the discharge end portion of the mold return conveyor.

Operation of our apparatus for manufacturing concrete pipe is as follows:

The molds M are picked up, one at a time, by the mold-receiving table 32 and carried by the carriage 26 into alignment with either of the centrifugal casting machines A. The push bar 51 is lowered so as to align with the delivery tube 46 and mold M. The concrete charger carriage 41 is then moved forwardly, causing the pusher bar 51 to push the mold M into the centrifugal casting drum 52. This is done with the end gates 58 open.

Movement of one mold M into the centrifugal casting drum 52 pushes the preceding mold therefrom and onto the table 70. After the mold is positioned, the end gates 58 are closed and secured. The pusher bar 51 is then raised and the charger carriage 41 moved further forward. This additional movement causes the mold-receiving table 32 to be deflected laterally by engagement of the cam roller 49 with the cam track 39.

The delivery tube 46 enters the mold and the screw conveyor 47 is operated as the delivery tube is moved back and forth in the mold M to distribute concrete therein. During this time the centrifugal casting drum 52 is rotated at sufficient speed to cause the concrete to be forced against the walls of the mold.

Upon completion of the centrifugal casting operation, the mold M with its pipe P cast therein is ejected by the introduction of a succeeding mold. While one centrifugal casting machine is completing the casting of cement previously deposited therein, the carriage 26 is employed to inject a mold into the other centrifugal casting machine and introduce cement therein. The mold with its pipe cast therein is picked up from the table 70 by the crane and hoist unit B and delivered to the platform 6 of the turntable structure C in the loading area 13.

The pipe P in the mold M is positioned on end and is moved through the partial curing room 9. The rate of rotation of the platform 6 is quite slow, so that the duration in the partial curing room may be several hours, or even as much as 24 to 36 hours. The partially cured pipe and mold then enter the moldstripping area 11 where the mold is removed by opening the mold along one side and stripping the mold axially from the pipe.

Figures 8, 9, 10, 11:
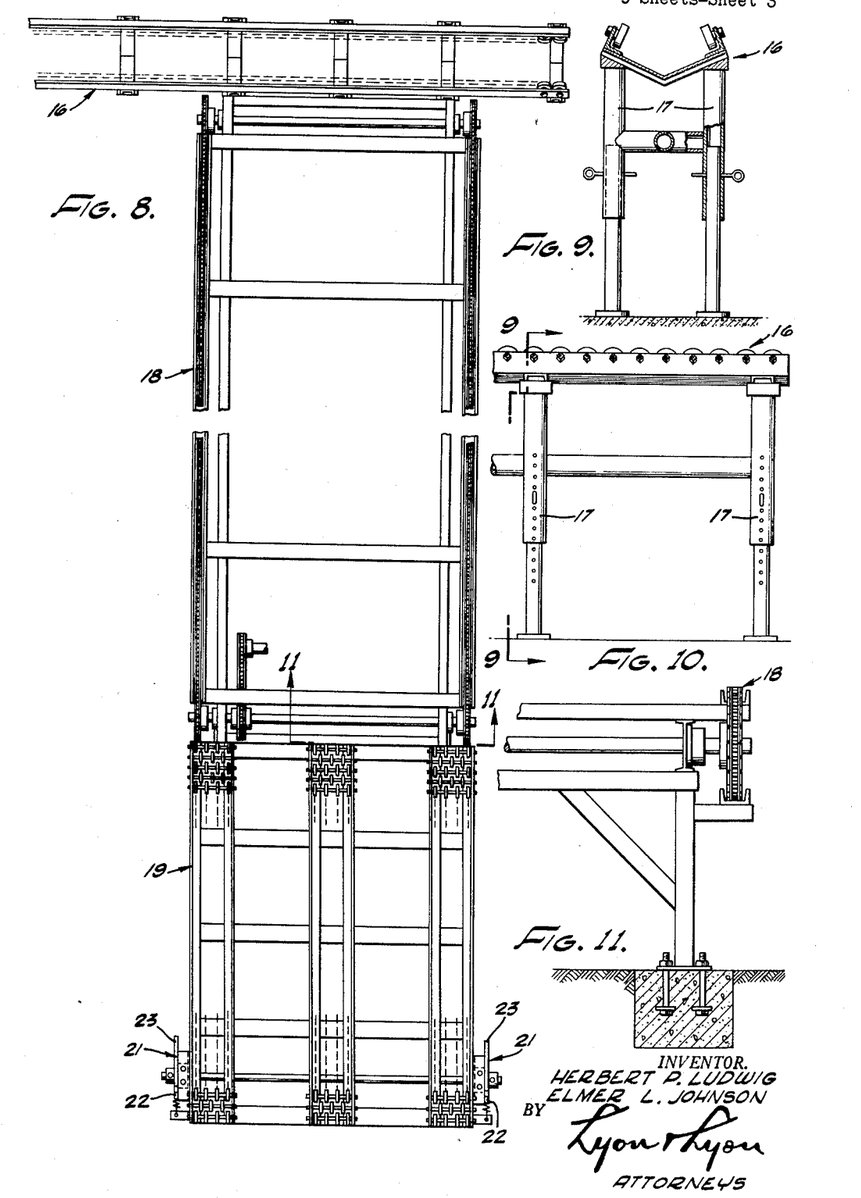
Fig. 8 is a top or plan view of the return conveyor unit.
Fig. 9 is a transverse sectional view, taken through 9—9 of Fig. 10, showing the mold-receiving table.
Fig. 10 is a fragmentary side view of the mold-receiving table.
Fig. 11 is a fragmentary sectional view, taken through 11—11 of Fig. 8, showing the mold return conveyor.

The mold M is then placed on the mold carrier 16 where it is cleaned and reassembled for reuse. In addition, a foraminous metal reinforcing cage may be placed in the mold, if the machine is employed in the casting of reinforced concrete pipe. The mold is then placed on the return conveyor 18 and passes to the temporary storage table 19 for delivery to the mold-receiving table 32.

The stripped pipe, in the meantime, passes into the final curing room or shed 10 and may remain therein for a day or so before emerging to the delivery area 12.

Figures 24, 25:
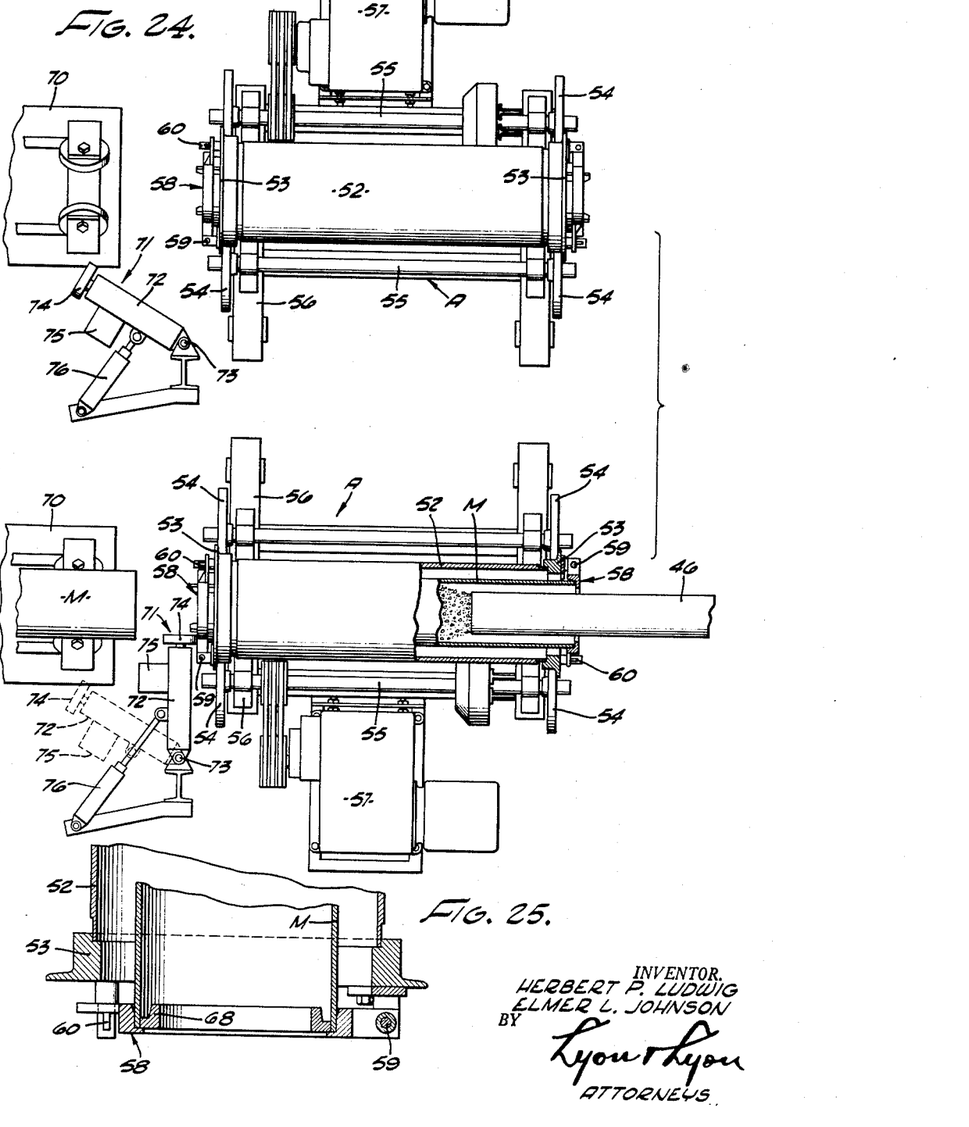
Fig. 24 is a top or plan view of the pair of centrifugal casting machines with a portion of one of said machines shown fragmentarily and in section.
Fig. 25 is a fragmentary sectional view through 25—25 of Fig. 23, showing the manner in which an end casting ring is secured in place.

During the centrifugal casting operation, one or both ends of the casting drum is engaged by a vibrator means 71 shown in Fig. 24. The vibrator comprises an arm 72 hinged to a post 73 and terminating in a roller 74. Mounted on the arm 72 is a conventional vibrator element 75. A hydraulic piston and cylinder unit 76 is employed to hold the roller 74 forcibly against the end ring of the drum, or to move the vibrator means clear of the centrifugal casting machine when changing molds.

The arrangement whereby vibration is imparted axially to the centrifugal casting drum is particularly effective. The concerete is rapidly leveled and, what is more important, the concrete is worked thoroughly into the end casting rings so that the concrete at the ends of the pipe is particularly dense, void free, and smooth surfaced.

It should be observed that one size of casting drum 52 may accommodate several sizes of molds by changing end gates, or the drum units may be interchangeable, as it is merely necessary to lift the drum from the supporting cradle and substitute another of different size. Thus by providing sets of molds and casting drums of different sizes, the size of pipe cast may be changed with a minimum of delay in the manufacture of the pipe.

Having fully described our invention, it is to be understood that we do not wish to be limited to the details herein set forth, but our invention is of the full scope of the appended claims.

We claim:

1. An apparatus for manufacturing concrete pipe, comprising: a tubular pipe-casting mold; a centrifugal casting machine, including a rotatable cylindrical drum having an unobstructed opening therethrough of larger diameter than said mold and adapted to receive said mold in its rearward end and eject said mold from its forward end, and means for centering said mold in said drum including end gates movable between an open position clearing the opening through said drum for passage of said mold and a closed position covering the ends of said drum, to engage the ends of said mold and retain said mold within said drum; a concrete supply means located rearwardly of said drum; means for moving said concrete supply means to and from said drum; a mold-supporting table adapted to be interposed between said concrete supply means and said drum; a ram carried by said concrete supply means for forcing one mold into said drum and causing said mold to eject a preceding mold; and a boom carried by said concrete supply means adapted to enter into said mold to distribute concrete therein.

2. An apparatus for manufacturing concrete pipe, comprising: a tubular pipe-casting mold; a centrifugal casting machine, including a rotatable cylindrical drum having an unobstructed opening therethrough of larger diameter than said mold and adapted to receive said mold in its rearward end and eject said mold from its forward end, and means for centering said mold in said drum including end gates movable between an open position clearing the opening through said drum for passage of said mold and a closed position covering the ends of said drum, to engage the ends of said mold and retain said mold within said drum; a concrete supply means located rearwardly of said drum; means for moving said concrete supply means to and from said drum; a mold-supporting table adapted to be interposed between said concrete supply means and said drum; a ram carried by said concrete supply means for forcing one mold into said drum and causing said mold to eject a preceding mold; a boom carried by said concrete supply means adapted to enter into said mold to distribute concrete therein; and means for automatically moving said mold-supporting table from between said concrete supply means and said drum to permit entry of said boom into said mold.

3. An apparatus for manufacturing concrete pipe, comprising: a tubular pipe-casting mold; a centrifugal casting machine, including a rotatable cylindrical drum having an unobstructed opening therethrough of larger diameter than said mold and adapted to receive said mold in its rearward end and eject said mold from its forward end, and means for centering said mold in said drum including end gates movable between an open position clearing the opening through said drum for passage of said mold and a closed position covering the ends of said drum, to engage the ends of said mold and retain said mold within said drum; a carriage structure rearwardly of said casting machine; a mold-supporting table mounted on said carriage, said table and carriage laterally movable relative to said casting machine to carry a mold into a position of alignment with said drum; a second carriage mounted on said carriage structure for movement axially of said drum; a ram carried by said second carriage for forcing a mold from said table into said casting machine and cause a preceding mold to be ejected therefrom; and a concrete supply means carried by said second carriage, including a tube adapted to enter said mold to distribute concrete therein.

4. An apparatus for manufacturing concrete pipe, comprising: a tubular pipe-casting mold; a centrifugal casting machine, including a rotatable cylindrical drum open at its ends and adapted to receive said mold in its rearward end and eject said mold from its forward end, and means for centering said mold in said drum including end gates adapted to engage the ends of said mold; a carriage structure rearwardly of said casting machine; a mold-supporting table mounted on said carriage, said table and carriage laterally movable relative to said casting machine to carry a mold into a position of alignment with said drum; a second carriage mounted on said carriage structure for movement axially of said drum; a ram carried by said second carriage for forcing a mold from said table into said casting machine and cause a preceding mold to be ejected therefrom; a concrete supply means carried by said second carriage, including a tube adapted to enter said mold to distribute concrete therein; means pivotally supporting said table on said carriage structure; a cam track on said table; and a cam-engaging member carried by said second carriage to pivot said table to one side of said carriage structure to permit entry of said tube in said mold.

5. A concrete pipe manufacturing apparatus, comprising: a longitudinally separable, tubular, concrete pipe-casting mold; a centrifugal casting machine, including a rotatable cylindrical drum having an unobstructed opening therethrough of sufficient diameter to receive said mold through its rearward end and eject said mold through its forward end, and gate rings at the ends of said drum movable between an open position clearing the opening of said drum, to permit passage of said mold into and through said drum, and a closed position overlying the ends of said mold for retaining said mold in said drum; vibrator means including a vibration transmission roller adapted to ride on at least one of said gate rings to impart axial vibration to said mold; a concrete supply means located rearwardly of said drum; means for moving said concrete supply means to and from said drum; a mold-supporting table adapted to be interposed between said concrete supply means and said drum; a ram carried by said concrete supply means for forcing one mold into said drum and causing said mold to eject a preceding mold; and a boom carried by said concrete supply means adapted to enter into said mold to distribute concrete therein.

6. A concrete pipe manufacturing apparatus, comprising: a longitudinally separable, tubular, concrete pipe-casting mold; a centrifugal casting machine, including a rotatable cylindrical drum having an unobstructed opening therethrough of sufficient diameter to receive said mold through its rearward end and eject said mold through its forward end, and gate rings at the ends of said drum movable between an open position clearing the opening of said drum, to permit passage of said mold into and through said drum, and a closed position overlying the ends of said mold for retaining said mold in said drum; vibrator means including a vibration transmission roller adapted to ride on at least one of said gate rings to impart axial vibration to said mold; a concrete supply means located rearwardly of said drum; means for moving said concrete supply means to and from said drum; a mold-supporting table adapted to be interposed between said concrete supply means and said drum; a ram carried by said concrete supply means for forcing one mold into said drum and causing said mold to eject a preceding mold; a boom carried by said concrete supply means adapted to enter into said mold to distribute concrete therein; and means for automatically moving said mold-supporting table from between said concrete supply means and said drum to permit entry of said boom into said mold.

7. A concrete pipe manufacturing apparatus, comprising: a longitudinally separable, tubular, concrete pipe-casting mold; a centrifugal casting machine, including a rotatable cylindrical drum having an unobstructed opening therethrough of sufficient diameter to receive said mold through its rearward end and eject said mold through its forward end, and gate rings at the ends of said drum movable between an open position clearing the opening of said drum, to permit passage of said mold into and through said drum, and a closed position overlying the ends of said mold for retaining said mold in said drum; vibrator means including a vibration transmission roller adapted to ride on at least one of said gate rings to impart axial vibration to said mold; a carriage structure rearwardly of said casting machine; a mold-supporting table mounted on said carriage, said table and carriage laterally movable relative to said casting machine to carry a mold into a position of alignment with said drum; a second carriage mounted on said carriage structure for movement axially of said drum; a ram carried by said second carriage for forcing a mold from said table into said casting machine and cause a preceding mold to be ejected therefrom; and a concrete supply means carried by said second carriage, including a tube adapted to enter said mold to distribute concrete therein.

8. A concrete pipe manufacturing apparatus, comprising: a longitudinally separable, tubular, concrete pipe-casting mold; a centrifugal casting machine, including a rotatable cylindrical drum open at its ends and adapted to receive said mold through its rearward end and eject said mold through its forward end, and gate rings at the ends of said drum for retaining said mold in said drum; vibrator means including a vibration transmission roller adapted to ride on at least one of said gate rings to impart axial vibration to said mold; a carriage structure rearwardly of said casting machine; a mold-supporting table mounted on said carriage, said table and carriage laterally movable relative to said casting machine to carry a mold into a position of alignment with said drum; a second carriage mounted on said carriage structure for movement axially of said drum; a ram carried by said second carriage for forcing a mold from said table into said casting machine and cause a preceding mold to be ejected therefrom; a concrete supply means carried by said second carriage, including a tube adapted to enter said mold to distribute concrete therein; means pivotally supporting said table on said carriage structure; a cam track on said table; and a cam-engaging member carried by said second carriage to pivot said table to one side of said carriage structure to permit entry of said tube in said mold.

References Cited in the file of this patent

UNITED STATES PATENTS

| | | |
|---|---|---|
| 965,003 | Pauly | July 19, 1910 |
| 1,286,056 | Moir et al. | Nov. 26, 1918 |
| 1,346,411 | Massey | July 13, 1920 |
| 1,493,399 | Sonley | May 6, 1924 |

(Other references on following page)

UNITED STATES PATENTS

| | | |
|---|---|---|
| 1,495,737 | Hanna | May 27, 1924 |
| 1,521,264 | Zehnder | Dec. 30, 1924 |
| 1,525,878 | Moir et al. | Feb. 10, 1925 |
| 1,600,286 | Lea | Sept. 21, 1926 |
| 1,992,739 | Carrington | Feb. 26, 1935 |
| 2,161,968 | Lyons | June 13, 1939 |
| 2,189,071 | Kopp | Feb. 6, 1940 |
| 2,342,801 | Guerci | Feb. 29, 1944 |
| 2,423,557 | Gray | July 8, 1947 |
| 2,583,842 | Hendrickson | Jan. 29, 1952 |